(12) United States Patent
Cooley et al.

(10) Patent No.: US 7,844,897 B1
(45) Date of Patent: Nov. 30, 2010

(54) BLOG TEMPLATE GENERATION

(75) Inventors: Daniel J. Cooley, San Francisco, CA (US); Mihir Deepak Gore, Bangalore (IN); Darrick P. Brown, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1060 days.

(21) Appl. No.: 11/544,812

(22) Filed: Oct. 5, 2006

(51) Int. Cl.
G06F 17/22 (2006.01)

(52) U.S. Cl. ............... 715/243; 715/234; 715/235; 715/236; 715/248; 715/249

(58) Field of Classification Search ............... 715/234, 715/235, 236, 243, 248, 249
See application file for complete search history.

(56) References Cited

U.S. PATENT DOCUMENTS

| | | | |
|---|---|---|---|
| 7,010,746 B2 * | 3/2006 | Purvis | 715/249 |
| 7,069,003 B2 | 6/2006 | Lehikoinen et al. | |
| 7,107,525 B2 * | 9/2006 | Purvis | 715/244 |
| 7,171,617 B2 * | 1/2007 | Harrington et al. | 715/255 |
| 7,225,401 B2 * | 5/2007 | Purvis | 715/230 |
| 7,243,303 B2 * | 7/2007 | Purvis et al. | 715/253 |
| 7,246,312 B2 * | 7/2007 | Harrngton et al. | 715/255 |
| 7,451,140 B2 * | 11/2008 | Purvis et al. | 1/1 |
| 7,487,445 B2 * | 2/2009 | Purvis et al. | 715/249 |
| 2003/0229607 A1 * | 12/2003 | Zellweger et al. | 707/1 |
| 2004/0019847 A1 * | 1/2004 | Purvis | 715/500 |
| 2004/0034613 A1 * | 2/2004 | Purvis et al. | 707/1 |
| 2004/0205588 A1 * | 10/2004 | Purvis et al. | 715/513 |
| 2004/0255245 A1 * | 12/2004 | Yamada et al. | 715/517 |
| 2004/0268306 A1 * | 12/2004 | Cheng et al. | 717/114 |
| 2005/0038717 A1 * | 2/2005 | McQueen et al. | 705/27 |
| 2005/0060277 A1 * | 3/2005 | Zlatanov et al. | 707/1 |
| 2005/0154980 A1 * | 7/2005 | Purvis et al. | 715/513 |
| 2006/0048053 A1 * | 3/2006 | Sembower et al. | 715/517 |
| 2006/0101035 A1 | 5/2006 | Mustakallio et al. | |
| 2006/0184578 A1 * | 8/2006 | La Rotonda et al. | 707/104.1 |
| 2006/0248071 A1 * | 11/2006 | Campbell et al. | 707/5 |
| 2007/0006072 A1 * | 1/2007 | Purvis | 715/517 |

* cited by examiner

*Primary Examiner*—Doug Hutton
*Assistant Examiner*—Andrew R Dyer
(74) *Attorney, Agent, or Firm*—Robert C Kowert; Meyertons, Hood, Kivlin, Kowert & Goetzel, P.C.

(57) ABSTRACT

Blog template generation is described, including sending test data to a target, calling the target, receiving a response from the target, wherein the response comprises stylized data associated with the target, identifying the test data in the response, the test data in the response being used to determine a separation between the test data and the stylized data, and generating a template based on the separation and the stylized data, the template being associated with the target.

26 Claims, 8 Drawing Sheets

BLOG TEMPLATE GENERATION

FIELD OF THE INVENTION

The present invention relates generally to software. More specifically, blog template generation is described.

BACKGROUND OF THE INVENTION

Conventional content publishing techniques for web logs ("blogs") allow users to create, edit, and delete content for a post. A post typically includes text and can also include images, graphics, video, and audio-based content. Blogs are often presented (i.e., render, display, and format) using different types of styles, layouts, formats, as well as different types of formatting languages such as HTML, XML, XHTML and others. When posting a blog or an entry to a blog, users typically seek to enter content that fits with the overall "look and feel" or context of an existing blog. However, conventional techniques do not provide What-You-See-Is-What-You-Get ("WYSIWYG") functionality. Conventional techniques that attempt to provide WYSIWYG blog entries (i.e., posts) are problematic and limited.

In some conventional techniques, blog publishing and editing applications do not have features or functionality that enables viewing or previewing content as content may appear once posted. Some conventional techniques provide previewing capabilities, but users are unable to edit content while being previewed. Still further, content publishing or editing techniques typically require labor and time intensive efforts, typically requiring users to generate stylized HTML, XML, and other types of formatted-data in order to generate content that fits contextually. This can result in the expenditure of large amounts of time and labor on authoring, editing, and other operations while using "trial and error" techniques to match desired content with an existing blog. Other conventional techniques provide only "code-level" (i.e., conventional applications that allow users to enter content in a program code-level view) views of content while authoring or editing. Posting a blog entry that is contextually tailored to fit with the style, layout, format, appearance, and other characteristics of the blog is difficult using conventional techniques.

Thus, a solution for blog authoring and editing without the limitations of conventional techniques is needed.

BRIEF DESCRIPTION OF THE DRAWINGS

Various examples are disclosed in the following detailed description and the accompanying drawings.

DETAILED DESCRIPTION

Figure 1:
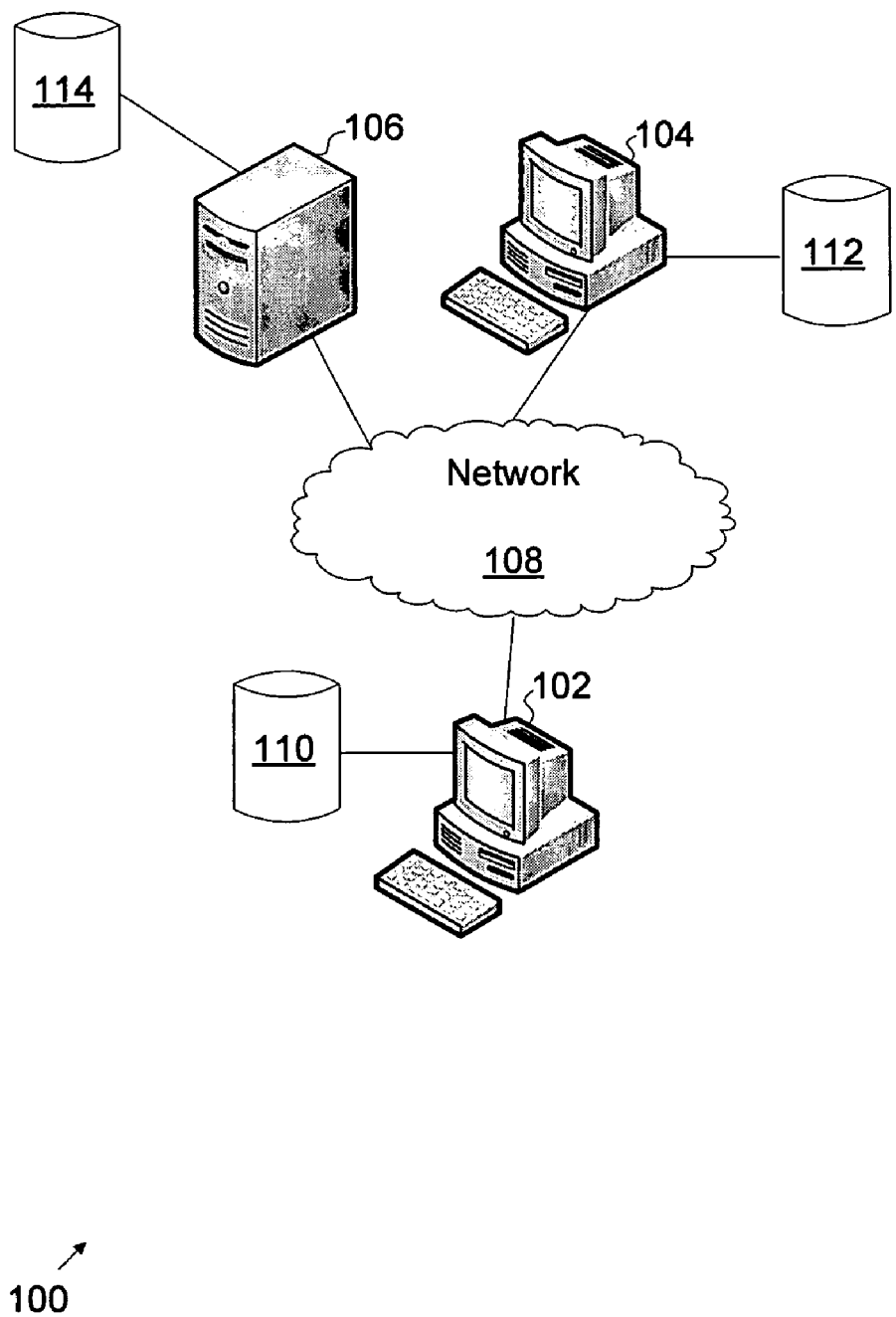
FIG. 1 illustrates an exemplary blog template generation system.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

Blog template generation is described, including generating or using stored templates for providing WYSIWYG templates that allow users to author and edit posts to a blog. Users may preview, view, author, and edit posts in a layout, style, or format that provides contextual relevance without using code-level editing applications or techniques. In some examples, a test entry may be sent to the location (i.e., uniform resource locator ("URL"), web, hypertext transfer protocol ("HTTP"), other type of address). When sent, a call or request is made to the location, thus retrieving data posted at the blog, including the test entry. Once called, the layout, style, format, and location (i.e., the location of the test entry when posted to the blog) of the test data may be identified and used to generate a WYSIWYG template. A WYSIWYG template thus allows users to enter content as it might appear on a blog once published. Further, a WYSIWYG template (hereafter "template") may be stored in a database, repository, data store, data warehouse, or the like and used when the same blog is called again in order to post an entry.

In some examples, the described techniques may be implemented as a standalone application or as a module or sub-component of another application. The described techniques may be implemented as software, hardware, firmware, circuitry, or a combination thereof. If implemented as software, the described techniques may be implemented using various types of programming, development, or formatting languages, frameworks, syntax, applications, protocols, objects, or techniques, including C, Objective C, C++, C#, Flex™, Java™, Javascript™, AJAX, COBOL, Fortran, ADA, XML, HTML, DHTML, XHTML, HTTP, XMPP, and others. Design, publishing, and other types of applications such as Dreamweaver® and Fireworks® may also be used to implement the described techniques. The described techniques may be varied and are not limited to the examples or descriptions provided.

FIG. 1 illustrates an exemplary blog template generation system. Here, system 100 includes computers 102-104, server 106, network 108, and storage 110-114. In some examples, computers 102-104 may be clients, peers, or another processor-based computing system or device (e.g., laptop, notebook, desktop computer, personal digital assistant (PDA), smart phone, and the like). Further, computers 102-104 may also be implemented as servers, providing blog template generation functionality substantially similar to that of server 106, as described in greater detail below. Storage 110-114 may, in some examples, be implemented as databases, data warehouses, data stores, storage area networks, or other repositories for storing, accessing, and retrieving data. In some examples, templates may be generated and stored in storage 110-114.

In some examples, blog templates may be generated by applications implemented, installed, or run from computers 102-104. Blog templates may be data sets or files that, when rendered, provide a formatted interface with editable and non-editable regions for WYSIWYG authoring or editing. Blog templates may refer to XML, HTML, XHTML, or other formatting data that determines how a blog entry should appear in order to be contextually integrated with the blog and other blog entries. For example, a user may wish to enter a blog entry as part of a series of blog entries that have a pre-existing "look and feel" or interface appearance, based on a given style, layout, format, colors, fonts, font types, and the like. A WYSIWYG blog template (hereafter "blog template") may be used to integrate content associated with a blog entry (e.g., text, images, photos, graphics, video, audio, and other forms of content), providing a user with the ability to author, edit, and view an entry as it appears once published.

Here, two computers (i.e., computers 102-104) are shown, but in other examples, the type and number of processing systems and devices may be varied. When computer 102 or 104 establish a connection to a blog server (e.g., server 106), a blog connection is established. A blog may be served and accessed from server 106. When called (i.e., visited, a web browsing application is directed to retrieve data from a given URL, address, or other location), server 106 established a blog connection with computers 102-104. When established, data that may be used to generate a blog template is exchanged between computers 102-104 and server 106. For example, when a blog connection is established between computer 102 and server 106, a test entry may be posted to a blog served by server 106. Once posted to a blog, the URL, address, or other location for the blog may be visited by computer 102 and data associated with the blog may be retrieved. In some examples, data associated with the blog may include blog entries, date and time stamps, author information, text, images, and the like ("blog data"). Downloaded blog data may be further evaluated to identify the location of the test blog entry and characteristics and features of the blog (e.g., style, layout, format, and other context information). Blog data retrieved from server 106 may be used by computers 102-104 to generate a blog template. Once generated, a blog template may be stored in storage 110-114 and used when a subsequent blog connection is established with the same blog. In other examples, a blog template may be used with other blogs, based on user or system-specified parameters. In still other examples, a blog template may be retrieved from storage 110-114 and updated when a subsequent blog connection is established. Further, generating a blog template may refer to creating a new WYSIWYG blog template or retrieving and using a blog template from storage 110-114. A blog connection may indicate that a previously generated blog template was stored (e.g., in storage 110-114). In other examples, system 100 and the above-described elements may be varied and are not limited to the examples provided.

Figure 2:
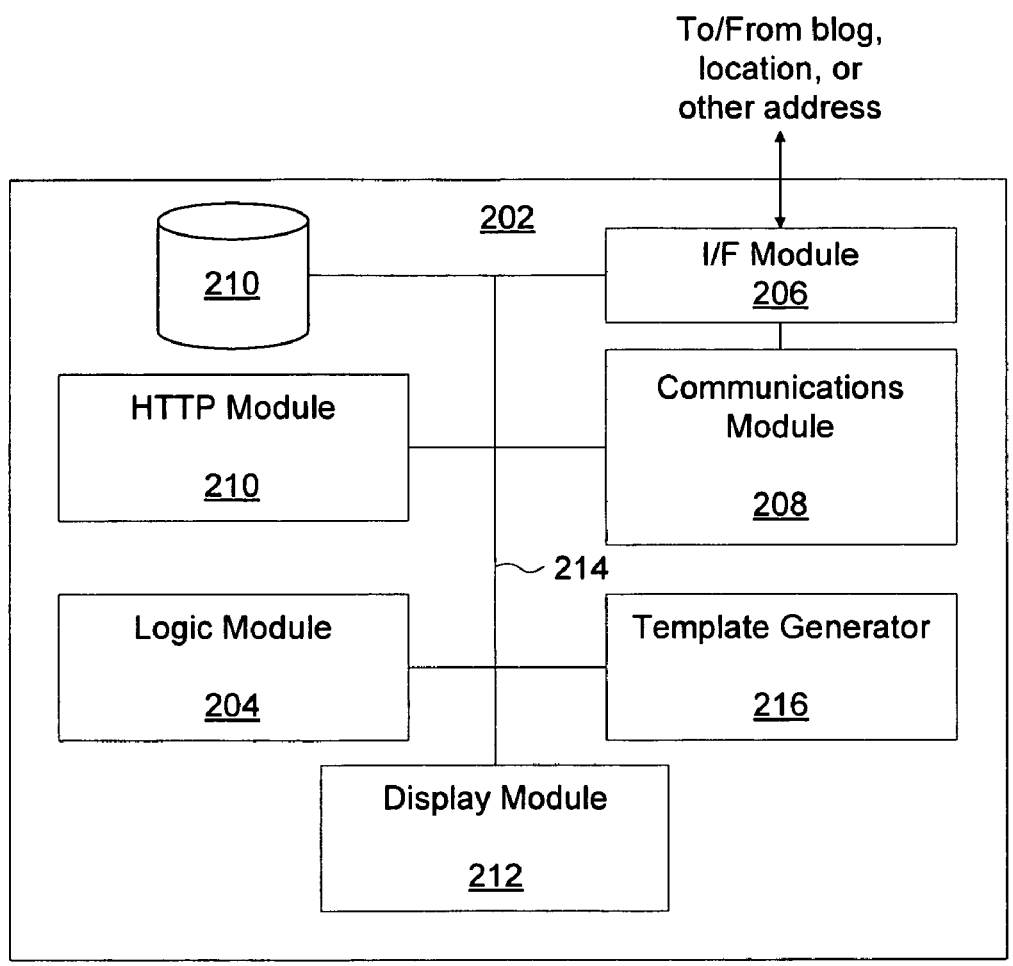
FIG. 2 illustrates an exemplary blog template generation application.

FIG. 2 illustrates an exemplary blog template generation application. Here, application 202 includes logic module 204, interface (I/F) module 206, communications module 208, HTTP module 210, display module 212, data bus 214, and template generator 216. In some examples, logic module 204 may be configured to provide control functions and features associated with application 202. For example, logic module 204 may be configured to control blog template generation by determining whether a new blog template should be created for a given blog connection. A blog connection may be established by communications module 208 and interface 210 with a blog by calling a URL, address, or other location. A blog connection may be a data link or exchange that is established between a blog server and a requesting host (e.g., client, server, peer, and others). Once called, data may be read and interpreted using HTTP module 210. Interpreted data retrieved from a blog may be handled by HTTP module 210 and passed, via data bus 214, to logic module 204. In some examples, logic module 204 may initiate generation of a blog template by creating a blog template, as described in greater detail below, or retrieving a blog template from storage 110-114 (FIG. 1) if a previous blog template was generated for a given blog connection.

Here, a blog template may be generated by template generator 216, which may use interpreted blog data read through HTTP (i.e., HTTP module 210). Blog data may include test blog data (i.e., a test blog entry), stylized data (e.g., XML, HTML, and other formatting, style, or layout information that is used to identify editable and non-editable regions of a blog), and other data that may be used to determine how to enter data into a given blog interface in a contextually relevant manner. In some examples, application 202 may be a standalone application that, when installed on computer 102-104 (FIG. 1), is configured to exchange blog data with, for example, an operating system, another application (e.g., a web browsing application), a creative or design application (e.g., design or publishing applications such as Dreamweaver® or Contribute® as developed by Adobe Systems Incorporated of San Jose, Calif.), and others. In other examples, application 202 may be served as a distributed application (e.g., web services application, web services distributed language (WSDL)-based application, and the like) that is hosted on server 106 and served, used, or run on computers 102 or 104. In still other examples, elements of application 202 may be implemented in part or entirely with other applications or in different operating systems or environments and is not limited to the examples provided and described above.

Figure 3A:
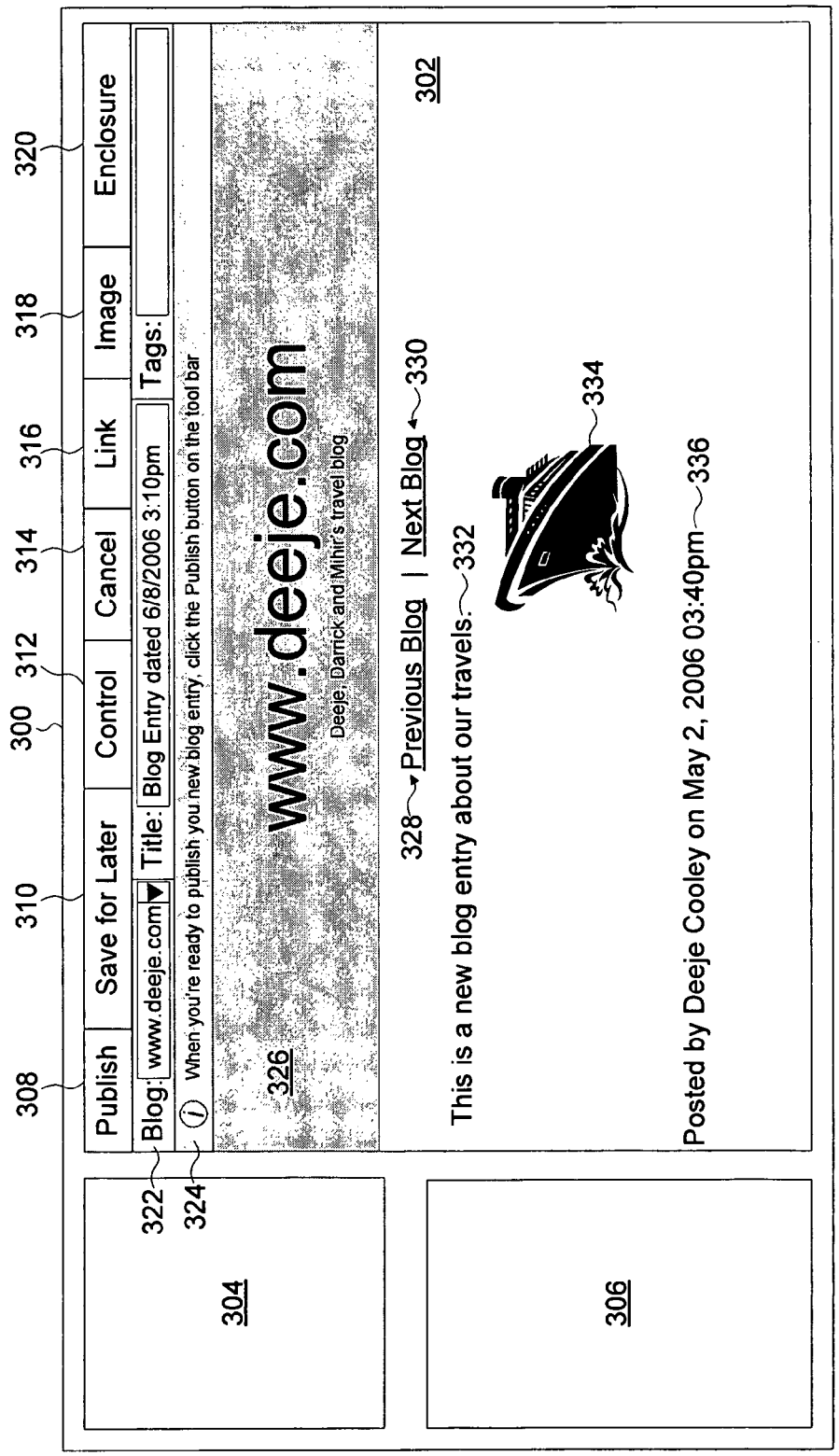
FIG. 3A illustrates an exemplary blog template generation interface.

FIG. 3A illustrates an exemplary blog template generation interface. Here, interface 300 includes blog template display 302, function region 304, function region 306, icons 308-320, menu bar 322, information item 324, blog header 326, navigation icons 328-330, text 332, image 334, and author identification 336. In some examples, application 202 (FIG. 2) may be implemented using interface 300, using blog template display 302 to provide an interface for authoring or editing a blog entry prior to posting to the blog (e.g., www.deeje.com). Here, content may be entered (e.g., "This is a new blog entry about our travels") into blog template display 302, which allows content to be entered in an interface that is substantially similar to the blog. Data (e.g., text, images, graphics, video, audio, and others) may be entered into a blog template using, for example, interface 300 and blog template display 302. Once entered, data may be saved, extracted, and/or sent to a blog server (i.e., server 106), where the data may be posted as a blog entry. When entered, data input into a blog template using blog template display 302 provides a WYSIWYG experience that is replicated when the data is sent to the intended location (i.e., URL, address, or other destination) and posted as a blog entry. In some examples, substantially similar or same user experiences may be created in both publishing/authoring/editing applications and when posted to a blog or blog server.

Here, icons 308-320 and menu bar 322 may be used to perform actions, operations, or functions associated with authoring, editing, or publishing content for a blog entry. Text (e.g., text 332, 336) and images (e.g., image 334) are illustrative of different types of content that may be entered using blog templates generated using the described techniques. For example, graphics, images, photos, animation, computer graphics ("CG"), text, audio, video, and other forms of media and content may be used. Further, other types of content may be entered into blog template display 302 beyond those described above. Here, when users author or edit content using application 202 in interface 300, content may be viewed (i.e., previewed) as though published to the blog by using a blog template. Further, content may be edited prior to posting to the blog, thus allowing users to preview, author, and edit content prior to posting entries to a blog server (e.g., server 106 (FIG. 1)). In other examples, interface 300 and the element shown and described may be varied in design, function, and implementation and are not limited to the examples provided.

Figure 3B:
FIG. 3B illustrates an exemplary blog using an exemplary blog template generation system.

FIG. 3B illustrates an exemplary blog using an exemplary blog template generation system. Here, interface 340 includes blog template display 302, blog header 326, navigation icons 328-330, text 332 and 342-344, image 334, and author identification 336, 346, and 348. In some examples, content may be authored or edited using blog template display 302 (FIG. 3A) and, when published, may appear substantially similar to interface 340. In other words, interface 340 illustrates an example of a blog entry that appears substantially similar to blog template display 302. When published, text 332, image 334, and author identification 336 may appear in the same context, style, layout, and format (i.e., blog header 326 and navigation icons 328-330). Interface 340 provides an example of how content authored, edited, or published using blog template generation techniques such as those described above may be published to a blog. In other examples, blog template display 302 may appear differently and is not limited to the style, layout, format, or other attributes provided. Further, interface 340 and the elements shown may be varied and are not limited to the design, function, or implementation examples described.

Figure 4A:
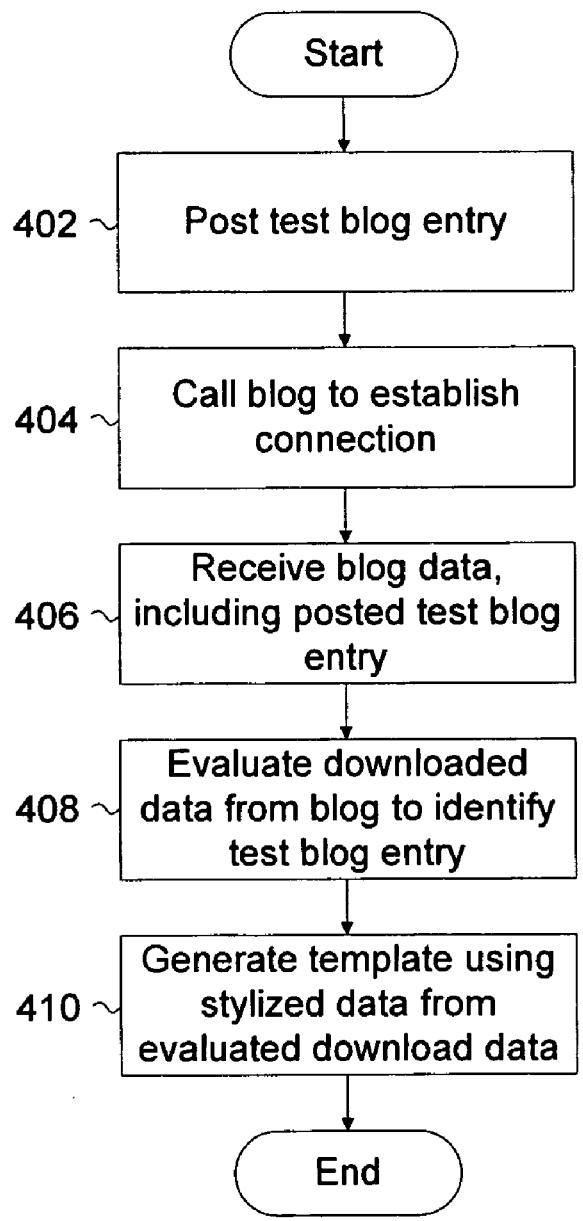
FIG. 4A illustrates an exemplary blog template generation process.

FIG. 4A illustrates an exemplary blog template generation process. Here, a test blog entry is posted to a blog (402). In some examples, a test blog entry may be given a date and time stamp to ensure that the entry does not interfere with current blog entries (i.e., posts). For example, a test blog entry may be given an earlier time or date stamp, which prevents the test blog entry from appearing in the most current blog entries. If all blog entries are retrieved and searched, the test blog entry may then appear. The test blog entry is submitted to provide identifiable data and information that, when retrieved, enables logic module 204 (FIG. 2) to determine stylized data (e.g., style, layout, design, format, and other characteristic information associated with the blog) apart from the test blog entry. Stylized data may be used to determine editable and non-editable regions of a blog, thus allowing templates to be created that have similar editable and non-editable regions. Thus, templates created and generated allow users to see how content may appear once posted (i.e., published) to a blog. Here, a blog connection is established by calling the blog (i.e., directing a browsing application or interface to a given URL, location, or address to retrieve data) and requesting blog data from the blog location (i.e., URL, address, or the like) (404). A blog may be downloaded and the received data may include the test blog entry with other blog entries (406). Once downloaded, blog data may be evaluated to identify and separate the test blog entry from the rest of the blog (408). Once identified, the test blog entry also identifies the separation of stylized data from user-entered content. Stylized data may provide information and data associated with identifying non-editable regions of a blog. The test blog entry may identify editable regions of a blog. Once determined, the editable and non-editable regions of a blog may be used to generate a WYSIWYG blog template (410). In other examples, the above-described process may be varied and is not limited to the examples provided.

Figure 4B:
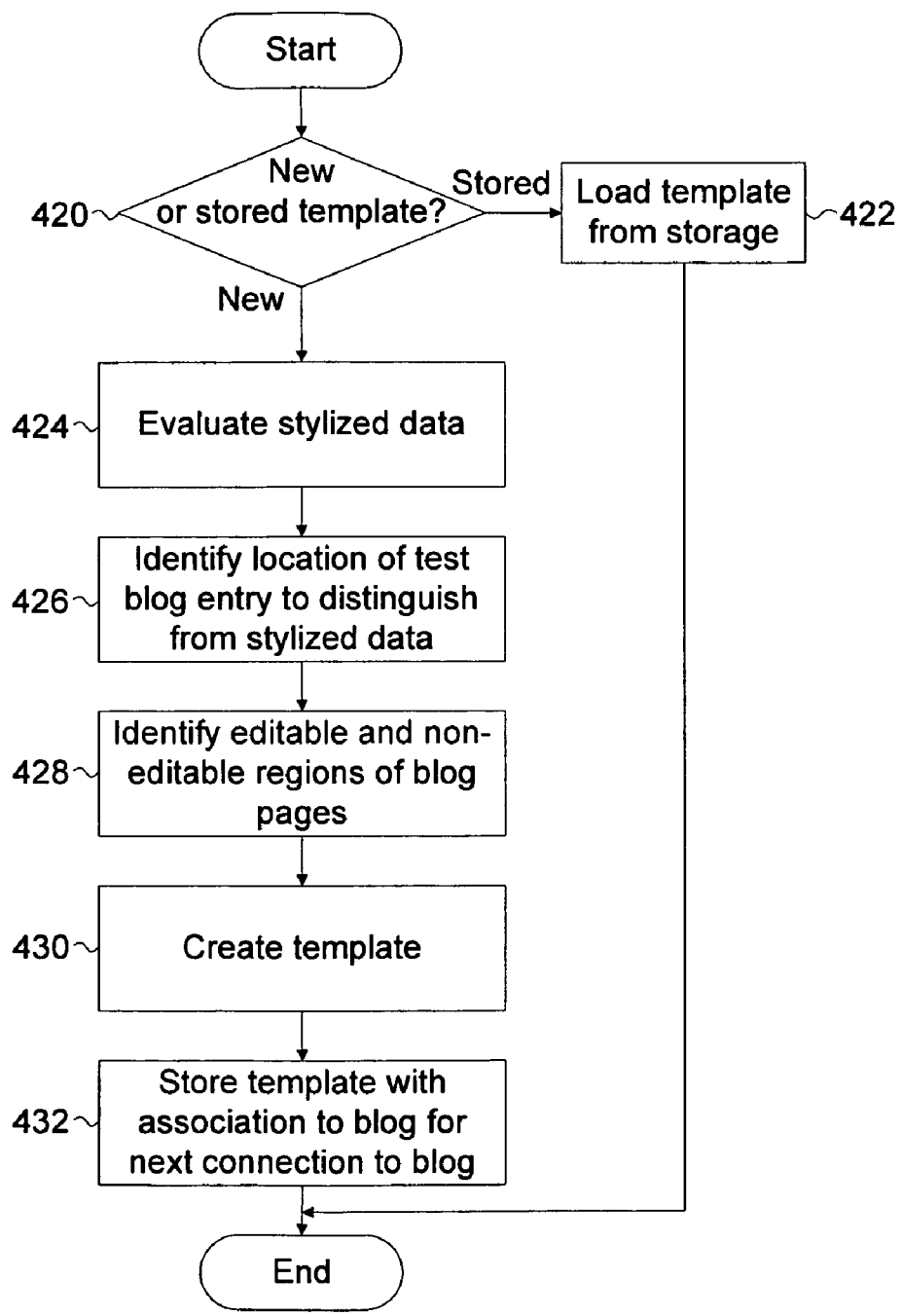
FIG. 4B illustrates an exemplary blog template generation sub-process.

FIG. 4B illustrates an exemplary blog template generation sub-process. Here, generating a blog template (410, FIG. 4A) is further described. In some examples, blog template generation may be implemented by determining whether a new blog template needs to be generated or whether a blog template already exists for the blog connection (420). Connection data associated with the blog (e.g., address, cookie (i.e., file used to identify previously visited Internet or web sites) may identify the blog as having been previously visited. If a previous blog connection was established to the blog, a blog template may be retrieved from storage 110-114 (FIG. 1) (422). If no previous connection was established to the blog location, then the stylized data identified from downloaded blog data is evaluated (424). The location of the test blog entry is identified, distinguishing content (i.e., user or system-authored, edited, or published) from stylized data (426). Once distinguished, content and stylized data in downloaded blog data are used to identify editable and non-editable regions of a blog (428). Once editable and non-editable regions of a blog have been determined, a WYSIWYG template is created (430). After creating the template, the template is stored in storage 110, 112, or 114 and subsequent connections to the same blog may use the stored template (432). The use of a blog template provides an efficient technique for WYSIWYG blog authoring, editing, or publishing that is contextually relevant. In some examples, templates may be used to post blog entries by entering content into a template that has been pre-set to provide editable and non-editable regions with pre-defined style, layout, format, design, and other information. In other examples, the above-described process may be varied and is not limited to the examples provided.

Figure 5:
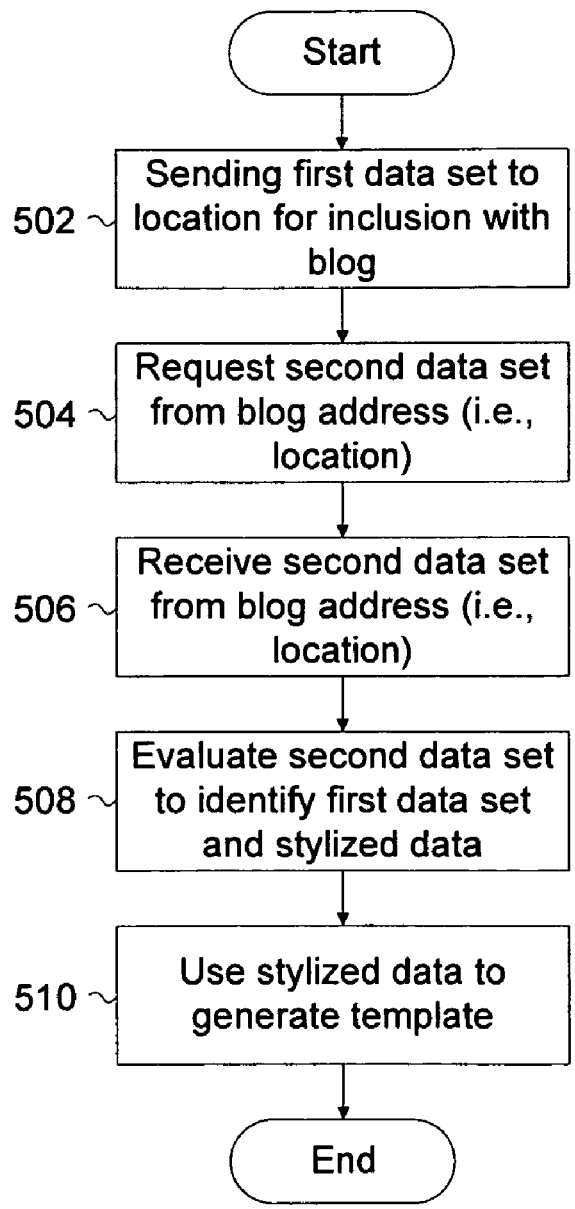
FIG. 5 illustrates an alternative exemplary blog template generation process.

FIG. 5 illustrates an alternative exemplary blog template generation process. Here, blog template generation may be performed using an alternative process. In some examples, a first data set is sent to a location (i.e., URL or other address for a blog) for inclusion with a blog (502). A first data set may be any set of data files, packets, segments, or content that may be used as a test blog entry. A request is then sent to retrieve a second data set (i.e., blog data) from the location (504). The second data set (i.e., blog data) is received in response to the request (506). Once received, the second data set is evaluated to identify the first data set and the separation of the first data set from stylized data included in the second data set (508). The above-described process in FIG. 4B may be used to generate a new or existing WYSIWYG blog template. Identified stylized data may then be used to generate a template (510).

Figure 6:
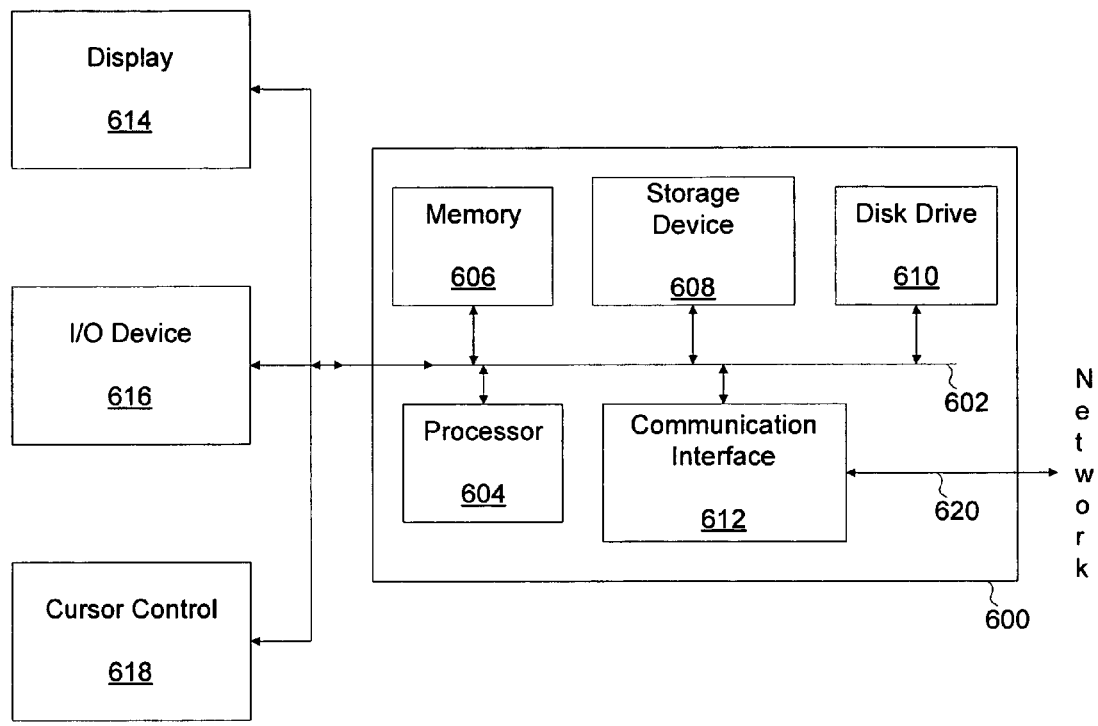
FIG. 6 illustrates an exemplary computer system suitable for blog template generation.

FIG. 6 illustrates an exemplary computer system suitable for blog template generation. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
    sending test data to a target location, wherein the test data comprises content to be posted at the target location, wherein the target location is provided by a server;
    accessing the target location;
    receiving a response from the target location, wherein the response comprises the test data and stylized data associated with the target location;
    identifying the test data in the response;
    determining a separation between the test data and the stylized data dependent on said identifying;
    generating a template for entries to be posted at the target location dependent on the separation and the stylized data;
    storing the template for subsequent use;
    receiving an entry to be posted to the target location, wherein the entry is formatted according to the template;
    extracting data representing content from the generated entry; and
    sending the extracted data to the target location post the content as an entry on the target location having a format substantially similar to that of the generated entry.

2. The method of claim 1, further comprising receiving the test data from a content editor.

3. The method of claim 1, further comprising receiving the test data from a publishing application.

4. The method of claim 1, wherein the server is a blog server.

5. The method of claim 1, wherein the target location is an address.

6. The method of claim 1, wherein said accessing the target location comprises requesting data from the target location subsequent to said sending the test data to the target location.

7. The method of claim 1, wherein said sending test data to the target location comprises pre-dating the test data.

8. The method of claim 1, wherein the separation identifies an editable region of the template.

9. The method of claim 1, wherein the separation identifies a non-editable region of the template.

10. The method of claim 1, wherein the stylized data identifies a layout for the template.

11. The method of claim 1, wherein the template provides a WYSIWYG interface for entering content on the target location, the template providing a format substantially similar to that provided by the target location.

12. The method of claim 1, wherein said storing comprises storing the template in a database.

13. The method of claim 12, further comprising retrieving the template from the database in response to an access to the target location subsequent to said generating and said storing.

14. A system, comprising:
    a processor; and
    a memory storing program instructions executable by the processor to implement:
    sending test data to a target location, wherein the test data comprises content to be posted at the target location, wherein the target location is provided by a server;
    accessing the target location;
    receiving a response from the target location, wherein the response comprises the test data and stylized data associated with the target location;
    identifying the test data in the response;
    determining a separation between the test data and the stylized data dependent on said identifying;
    generating a template for entries to be posted at the target location dependent on the separation and the stylized data;
    storing the template for subsequent use;
    receiving an entry to be posted to the target location, wherein the entry is formatted according to the template;
    extracting data representing content from the generated entry; and
    sending the extracted data to the target location post the content as an entry on the target location having a format substantially similar to that of the generated entry.

15. A computer readable medium storing instructions computer executable to implement:
    sending test data to a target location, wherein the test data comprises content to be posted at the target location, wherein the target location is provided by a server;
    accessing the target location;
    receiving a response from the target location, wherein the response comprises the test data and stylized data associated with the target location;
    identifying the test data in the response;

determining a separation between the test data and the stylized data dependent on said identifying;

generating a template for entries to be posted at the target location dependent on the separation and the stylized data;

storing the template for subsequent use;

receiving an entry to be posted to the target location, wherein the entry is formatted according to the template;

extracting data representing content from the generated entry; and sending the extracted data to the target location post the content as an entry on the target location having a format substantially similar to that of the generated entry.

16. A method, comprising:

sending a first data set to a target location, wherein the first data set is used to generate a second data set that is presented at the target location, and wherein the second data set comprises the first data set and stylized data associated with the target location, wherein the target location is provided by a server;

requesting the second data set from the target location;

receiving the second data set from the target location;

evaluating the second data set to identify the first data set and the stylized data;

using the stylized data to generate a template having an editable region and a non-editable region, wherein data sets generated using the template are substantially similar in appearance to data sets presented at the target location;

receiving an entry to be presented at the target location, wherein the entry has an editable region and a non-editable region according to the template;

extracting a third data set from the editable region of the entry; and using the third data set to prepare a post to be presented at the target location.

17. The method of claim 16, wherein the first data set is a post.

18. The method of claim 16, wherein the second data set is a blog.

19. The method of claim 16, wherein the location is an address.

20. The method of claim 16, wherein said evaluating the second data set comprises determining a separation between the first data set and the stylized data, the separation identifying the editable region.

21. The method of claim 16, further comprising storing the template in a database, wherein the template is associated with the target location in the database.

22. The method of claim 16, further comprising retrieving the template when another data set is requested from the target location subsequent to said requesting the second data set.

23. The method of claim 16, wherein said using the stylized data to generate the template comprises retrieving a stored template associated with a previous connection to the target location.

24. A system, comprising:

a database configured to store data; and logic configured to:

send a first data set to a target location, wherein the first data set is used to generate a second data set that is presented at the target location, and wherein the second data set comprises the first data set and stylized data associated with the target location, wherein the target location is provided by a server;

request the second data set from the target location;

receive the second data set from the target location;

evaluate the second data set to identify the first data set and the stylized data;

use the stylized data to generate a template having an editable region and a non-editable region, wherein data sets generated using the template are substantially similar in appearance to data sets presented at the target location;

receiving an entry to be presented at the target location, wherein the entry has an editable region and a non-editable region according to the template;

extracting a third data set from the editable region of the entry; and using the third data set to prepare a post to be presented at the target location.

25. The system of claim 24, further comprising logic configured to use another template to generate the template, the another template having other stylized data identifying one or more of layout, style or format.

26. A computer readable medium storing instructions computer executable to implement:

sending a first data set to a target location, wherein the first data set is used to generate a second data set that is presented at the target location, and wherein the second data set comprises the first data set and stylized data associated with the target location, wherein the target location is provided by a server;

requesting the second data set from the target location;

receiving the second data set from the target location;

evaluating the second data set to identify the first data set and the stylized data;

using the stylized data to generate a template having an editable region and a non-editable region, wherein data sets generated using the template are substantially similar in appearance to data sets presented at the target location;

receiving an entry to be presented at the target location, wherein the entry has an editable region and a non-editable region according to the template;

extracting a third data set from the editable region of the entry; and using the third data set to prepare a post to be presented at the target location.

* * * * *